United States Patent
Lin et al.

(10) Patent No.: US 10,445,569 B1
(45) Date of Patent: Oct. 15, 2019

(54) COMBINATION OF HETEROGENEOUS RECOGNIZER FOR IMAGE-BASED CHARACTER RECOGNITION

(71) Applicant: A9.com, Inc., Palo Alto, CA (US)

(72) Inventors: Xiaofan Lin, Palo Alto, CA (US); Son Dinh Tran, Sunnyvale, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

(21) Appl. No.: 15/251,832

(22) Filed: Aug. 30, 2016

(51) Int. Cl.
*G06K 9/00* (2006.01)
*G06T 7/60* (2017.01)
(Continued)

(52) U.S. Cl.
CPC ....... *G06K 9/00442* (2013.01); *G06K 9/4604* (2013.01); *G06K 9/52* (2013.01);
(Continued)

(58) Field of Classification Search
CPC ............. G06K 2209/01; G06K 9/6292; G06K 9/00442; G06K 9/4604; G06K 9/6267; G06K 9/52; G06K 9/66; G06T 7/60; G06T 7/13; G06T 7/0004; G06T 2207/20112; G06T 2207/30108; G06F 17/2775
USPC ......................................... 382/182
See application file for complete search history.

(56) References Cited

U.S. PATENT DOCUMENTS 5,418,864 A * 5/1995 Murdock ............. G06K 9/6292
382/224

9,043,349 B1 * 5/2015 Lin ........................... G06K 9/18
382/257
(Continued)

OTHER PUBLICATIONS

Jaderberg, Max, et al. "Reading text in the wild with convolutional neural networks." International Journal of Computer Vision 116.1 (2016): 1-20.*
(Continued)

*Primary Examiner* — Wesley J Tucker
(74) *Attorney, Agent, or Firm* — Hogan Lovells US, LLP

(57) ABSTRACT

Approaches provide for recognizing and locating text represented in image data. For example, image data that includes representations of text can be obtained. A width-focused recognition engine can be configured to analyze the image data to determine a base-set of words. The base-set of words can be associated with logical structure information that describes a geometric relationship between words in the base-set of words. A set of bounding boxes that includes one or more base words can be determined, as well as a confidence value for each base word. A depth-focused recognition engine can be configured to analyze the image data to determine a focused-set of words, the focused-set of words associated with a set of bounding boxes and confidence values for respective words. A set of merged words can be determined from a set of overlapping bounding boxes that overlap a threshold amount. The set of merged words can include at least a portion of the base-set of words and/or the focused-set of words and are selected based at least in part on respective confidence values of words in the set of overlapping bounding boxes. Thereafter, a final set of words that includes the merged set of words and appended words can be determined.

20 Claims, 6 Drawing Sheets

(51) Int. Cl.
*G06K 9/52* (2006.01)
*G06K 9/66* (2006.01)
*G06T 7/00* (2017.01)
*G06K 9/46* (2006.01)
*G06K 9/62* (2006.01)
*G06F 17/27* (2006.01)

(52) U.S. Cl.
CPC .............. *G06K 9/6267* (2013.01); *G06K 9/66* (2013.01); *G06T 7/0004* (2013.01); *G06T 7/0085* (2013.01); *G06T 7/60* (2013.01); *G06F 17/2775* (2013.01); *G06T 2207/20112* (2013.01); *G06T 2207/30108* (2013.01)

(56) References Cited

U.S. PATENT DOCUMENTS

| | | | | |
|---|---|---|---|---|
| 2007/0104370 | A1* | 5/2007 | Rosenbaum | G06K 9/6292 382/182 |
| 2008/0063279 | A1* | 3/2008 | Vincent | G06K 9/00463 382/182 |
| 2012/0134589 | A1* | 5/2012 | Reddy | G06K 9/6255 382/182 |
| 2014/0337174 | A1* | 11/2014 | Lin | G06Q 30/0623 705/26.61 |
| 2015/0286888 | A1* | 10/2015 | Maison | G06F 17/21 382/182 |

OTHER PUBLICATIONS

Moler, Cleve. "Parallel MATLAB: Multiple Processors and Multiple Cores." Mathworks. 2007.*

* cited by examiner

COMBINATION OF HETEROGENEOUS RECOGNIZER FOR IMAGE-BASED CHARACTER RECOGNITION

BACKGROUND

Optical character recognition (OCR) systems are generally used to detect text present in an image and to convert the detected text into its equivalent electronic representation. In order to accurately recognize text with a conventional OCR engine, the image typically needs to be of a high quality. The quality of the image depends on various factors such as the power of the lens, light intensity variation, relative motion between the camera and text, focus, and so forth. Generally, an OCR engine can detect a majority of text characters in good quality images, such as images having uniform intensity, no relative motion, and good focus. However, even with good quality images, conventional OCR engines are still often unable to accurately detect all text characters. This imprecision is further exacerbated when attempting to recognize text from lesser quality images, such as images containing variations in lighting, shadows, contrast, glare, blur, and the like. As technology advances and as people are increasingly using portable computing devices in a wider variety of ways, it can be advantageous to adapt the ways in which images are processed by an OCR engine in order to improve text recognition precision.

BRIEF DESCRIPTION OF THE DRAWINGS

Various embodiments in accordance with the present disclosure will be described with reference to the drawings, in which.

DETAILED DESCRIPTION

Figure 1:
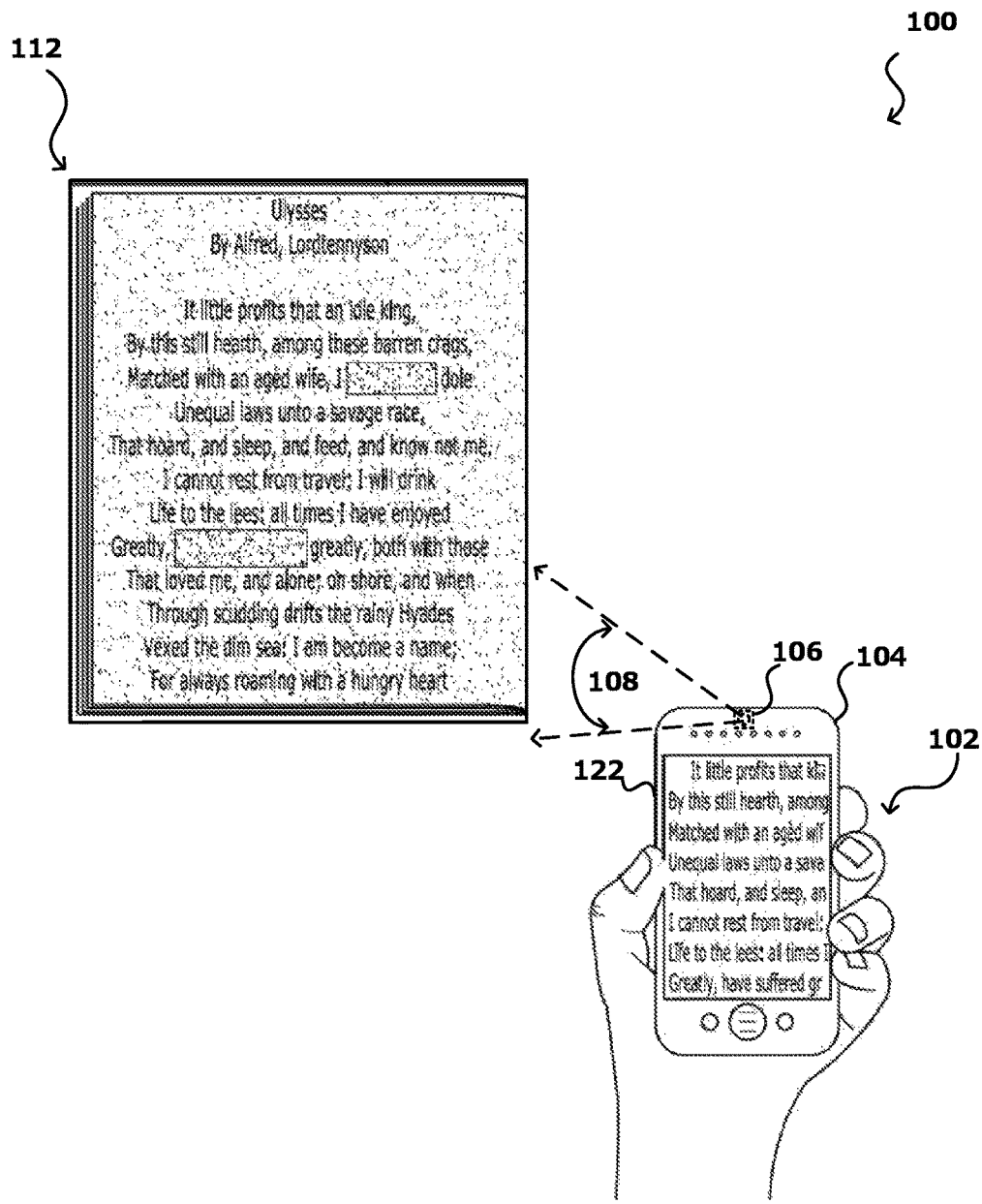
FIG. 1 illustrates an example situation where a user is attempting to recognize text with a computing device in accordance with various embodiments.

Systems and methods in accordance with various embodiments of the present disclosure may overcome one or more of the aforementioned and other deficiencies experienced in conventional approaches to recognizing text using an electronic device. In particular, various approaches provide for recognizing and locating text represented in image data, and providing the recognized text to an application executing on the device for performing a function (e.g., searching for calling a number, opening an internet browser, etc.) associated with the recognized text.

For example, a camera of a computing device can be used to capture image data that includes representations of text. An application executing on the computing device (or at least in communication with the computing device) can analyze the image data to recognize words represented in the image data as well as determine locations or regions of the image that include the representations. Analyzing the image data can include substantially simultaneously or concurrently processing the image data with at least two recognition engines, such as at least two optical character recognition (OCR) engines, running in a multithreaded mode. For example, a width-focused recognition engine can be configured to analyze the image data to determine a base-set of words. The base-set of words can be associated with logical structure information that describes a geometric relationship between words in the base-set of words. The logical structure information can include, for example, information for word, sentence, and paragraph locations in the image data, punctuation for recognized text, etc. A set of bounding boxes that includes text can be determined, as well as a confidence value for each word that indicates a likelihood that a word is correctly recognized. A depth-focused recognition engine can be configured to analyze the image data to determine a focused-set of words, the focused-set of words associated with a set of bounding boxes and confidence values for respective words. The confidence values associated with respective sets of words can be normalized to a common scale. A set of merged words can be determined from a set of overlapping bounding boxes that overlap a threshold amount. The set of merged words can include at least a portion of the base-set of words and/or the focused-set of words and can be selected based at least in part on respective confidence values of words in the set of overlapping bounding boxes. Thereafter, a final set of words that includes the merged set of words and appended words (i.e., depth-focused words determined not to be overlapping a threshold amount) can be determined.

In at least one embodiment, image capture can be performed using a single image, multiple images, periodic imaging, continuous image capturing, image streaming, and the like. For example, the computing device can capture multiple images (or video) of text in a continuous mode and provide at least a portion of the same to the recognition engines to separately recognize text from multiple images. The multiple OCR outputs corresponding to recognized text from the multiple images can then be compared to either verify image details or to capture details that have been obscured or missed in one image or frame. In another example, a single image can be provided to the recognition engines either in real-time or at a later time compared to when the image was captured, such as a previously captured image stored in a photo gallery. Accordingly, at least a portion of these tasks can be performed on a portable computing device or using at least one resource available across a network as well. For example, in certain embodiments, the width-focused recognition engine can execute on a first computing device and the depth-focused recognition engine can execute on a second computing device, the first computing device and the second computing device provided by a service provider of a computing environment. In other embodiments, the recognition engines can execute on the same or executed across multiple devices.

Embodiments provide a variety of advantages. For example, by providing better text recognition, the system can better determine related products and services to the recognized text. Accordingly, fewer interactions are necessary for searching for products and a user may be interested in. As such, fewer resources of the computing system are necessary to execute word recognition techniques, find related products and services, etc. As such, embodiments improve the ability for a system to recognize words and provide related information to a user.

Various other functions and advantages are described and suggested below as may be provided in accordance with the various embodiments.

FIG. 1 illustrates an example situation 100 in which a user 102 is attempting to recognize text in a book 112. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. In this example, the user can position the device such that one or more items of interest 112 are within a field of view 108 of at least one camera 106 on the computing device. The camera might capture video, such that a "live" view of the captured video information can be displayed on a display screen 122 of the computing device 104. In other embodiments, the camera might capture a still image showing a representation of the item(s) of interest. In at least some embodiments, the image and/or a frame of the video can be analyzed, such as by analyzing on the device or uploading across a network to a service for analyzing image content. It should be noted that in various embodiments the image data can be downloaded to the computing device.

In this example, however, attempting to recognize text in the book using a mobile query image such as that illustrated in FIG. 1 can be difficult and extremely resource intensive. For example, as shown, some text is missing and the book page is of low quality, which for conventional text recognition approaches can result in low quality recognition results. Further, optical character recognition (OCR) approaches have traditionally involved recognizing text printed against white or plain backgrounds. In situations where text recognition is needed against image poorly rendered backgrounds, such as the one illustrated in FIG. 1, such traditional approaches can be difficulty and resource intensive. Accordingly, in accordance with various embodiments, since different algorithms and recognition engines have different strengths and weaknesses, it can be advantageous to integrate information from multiple recognition engines.

Figure 2:
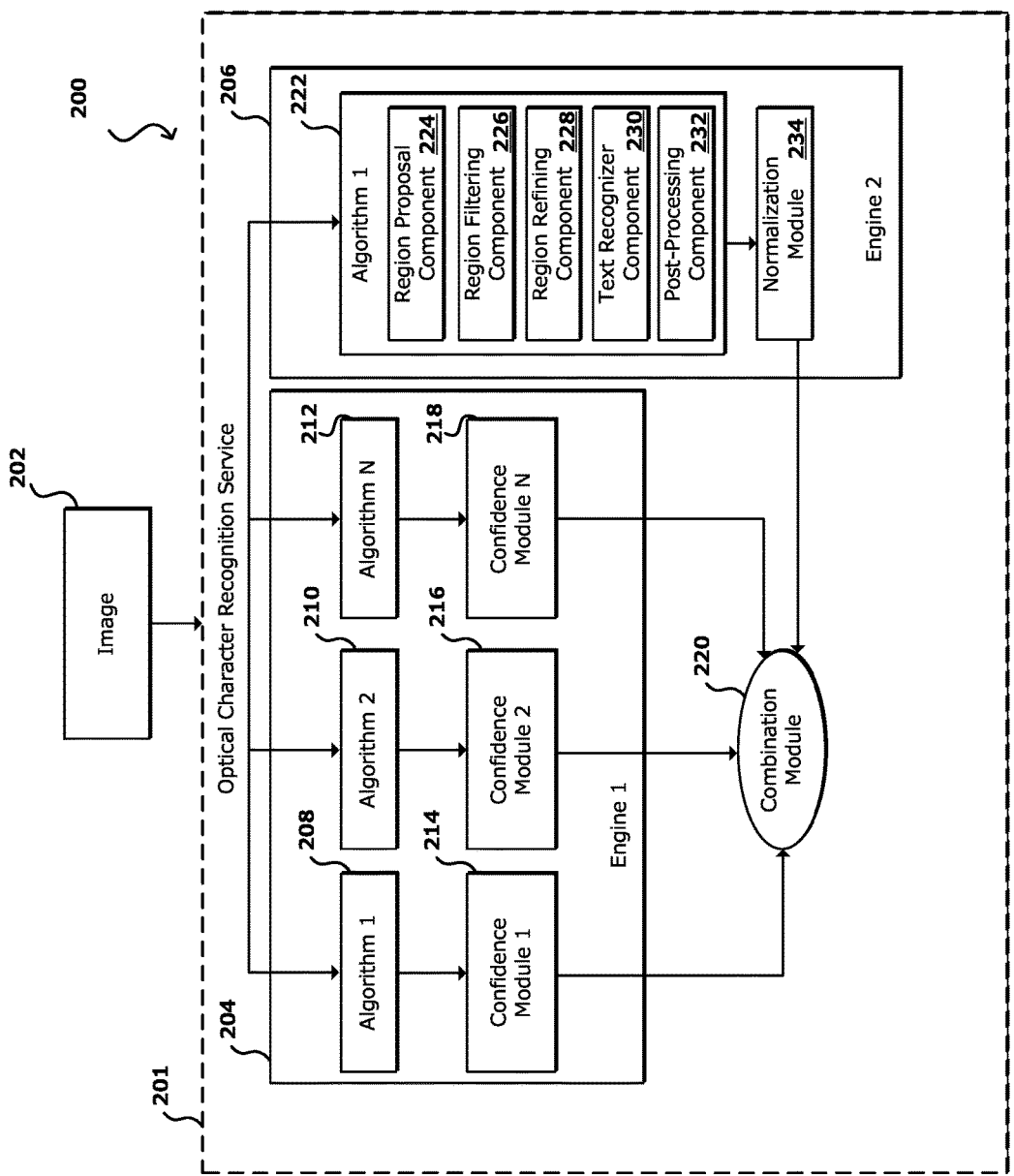
FIG. 2 illustrates an example visual representation of a process of recognizing text in accordance with at least one embodiment.

FIG. 2 illustrates an example visual representation of a process 200 of recognizing text in accordance with at least one embodiment. As described, analyzing the image data can include processing the image data with at least two recognition engines, such as at least two optical character recognition (OCR) engines, running in a multithreaded mode. As shown in FIG. 2, an optical character recognition service 201 includes a first recognition engine 204 and a second recognition engine 206. It should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein.

The first recognition engine 204 can utilize a number of recognition algorithms to recognize text in image data. In this example, recognition engine 204 utilizes recognition algorithms 208, 210 up to N number of recognition algorithms 212, where N can be any number. Before processing the image data at recognition engine 204, image data 202 may undergo various preprocessing techniques. The preprocessing techniques can be executed on the portable computing device, at a server that includes at least recognition engine 204, some other component or server, or a combination thereof. For example, a preprocessing component can implement algorithms that detect and recognize the location of text in the image data 202, and the region of the image data 202 that includes the text can be selected or cropped to remove irrelevant portions of the image data 202 and to highlight relevant regions containing text. The relevant regions can be binarized, and, thereafter, provided or communicated to a server executing at least the recognition engine 204. Alternatively, in accordance with at least one embodiment, a grey scale image, color image or any other image (selected/cropped or otherwise not selected/cropped) can be communicated to the server (or remain on the portable computing device) for further processing.

In accordance with various embodiments, detecting text in the image data 202 can include locating regions of extremes (e.g., regions of sharp transitions between pixel values) such as the edges of letters. The regions of extremes, or the maximally stable extremal regions, can be extracted and analyzed to detect characters, where the detected characters can be connected and/or aggregated. A text line algorithm can be used to determine the orientation of the connected characters, and once the orientation of the characters is determined, a binary mask of the region containing the characters can be extracted. The binary mask can be converted into a black white representation, and the black white representation can be communicated recognition engine 204 or other text recognition engine for further processing.

Once the preprocessing is completed, the binary mask is provided to recognition engine 204 which includes a first recognition algorithm 208, a second recognition algorithm 210, and an $n^{th}$ recognition algorithm 212 for concurrent character recognition processing in a multithreaded mode. In at least one embodiment, each recognition algorithm (208, 210, 212) can be tuned so that their respective processing speeds are roughly the same to within an allowable or reasonable deviation. Tuning the processing speeds of the recognition algorithms (208, 210, 212) enables processing latency to be close to that of using only one recognition engine, in at least one example.

After text is recognized by recognition algorithms (208, 210, 212), the recognized text is assigned a confidence value. In at least one embodiment, the recognized text from each recognition algorithms (208, 210, 212) goes through a respective confidence ranking module (214, 216, 218), which determine a probability associated with the accuracy of the recognized text. The confidence ranking modules (214, 216, 218) do not know whether any word or character is correct or not and, therefore, a confidence value is assigned thereto. In one example, in order to determine a respective confidence value, each respective confidence ranking module (214, 216, 218) includes a conversion table based on the statistical analysis of comparing testing results against the ground truth of one or more training sets of known text. The conversion table is then used to determine the confidence value for future unknown text from an image.

Various other approaches for determining confidence can be used as well as discussed or suggested elsewhere herein.

In at least one embodiment, the confidence ranking modules (214, 216, 218) can calculate confidence values for each detected character, which can then be extended to each word or page. In at least one example, the confidence ranking modules (214, 216, 218) use algorithms either associated with the recognition algorithm (208, 210, 212) or as an external customized process. The confidence values can vary between different recognition algorithms depending on a number of different variables including the font style, font size, whether the text is bolded, underlined, or italicized, and the like. Further, the confidence ranking modules (214, 216, 218) may take various other attributes into account. For example, determining whether a string of text is a word in a dictionary can increase the recognized text's confidence value or, if the word contains incoherent patterns, such as a high frequency of repeating the same character and the like, will decrease the recognized text's confidence value.

After the confidence values for the recognized text have been determined, a combination module 220 determines a consensus string of text that is a compilation of the recognized text from each recognition algorithm (208, 210, 212) weighted by their respective confidence values. In accordance with various embodiments, the combination module 220 can execute on the same computing device where the recognition engine 204 executes or a different computing device, such as the same computing device as where recognition engine 206 executes or some other computing device. In order to accomplish this, a correspondence between the recognized text from each recognition algorithm (208, 210, 212) is established. In this example, each algorithm (208, 210, 212) will report coordinates of a bounding box for the recognized text. A bounding box can be the coordinates of a rectangular border that fully encloses portions of the image that, for example, include text. The bounding box for the recognized text is then used to align the recognized text from each recognition algorithm (208, 210, 212) to determine a correspondence. An overlap percentage of the bounding boxes can be used to map recognized text from one recognition engine to recognized text from another recognition engine. If the recognized text received from each recognition algorithm (208, 210, 212) is not identical, then each word within the recognized text is assigned a final confidence value based a combination function, such as a linear function, that is a combination of each recognition engine weighted by a respective confidence value. Other factors, such as past performance of a particular engine can also be factored into the weighting or linear function. Thereafter, the recognized text with the highest final confidence value is selected and merged with results determined from the recognition engine 206.

As described, the image data 204 is also processed by recognition engine 206 which can utilize deep neural networks. Recognition engine 206 includes algorithm 222 that can include a region proposal component to generate a plurality of candidate bounding boxes, a region filtering component to determine a subset of the plurality of candidate bounding boxes, a region refining component to refine the bounding box coordinates to more accurately fit the identified text, a text recognizer component to recognize words in the refined bounding boxes, and a post-processing component to suppress overlapping words to generate a final set of words.

The region proposal component 224 of recognition algorithm 222 can be configured to analyze the image data 202 to generate a plurality of candidate bounding boxes (or overlapping regions of interest). The bounding boxes are candidate bounding boxes because some boxes may be filtered as will be described further herein. In accordance with various embodiments, various detection proposal techniques can be implemented by the region proposal component as would be understood to those skilled in the art. For example, a combination of general object region proposals and text-specific region proposals can be implemented. Example region proposals include geodesic object proposals (GOP), binarized normed gradients (BING), EdgeBoxes, maximally stable extremal regions (MSER), among other such approaches. In accordance with various embodiments, the general object region proposals and text-specific region proposals can be trained on one or more object detection datasets and text detection data sets respectively, and the parameters of the proposals can be chosen such that chosen proposals produce a predetermined number of candidate bounding boxes per image. An example number of candidate bounding boxes can be six thousand.

In a first step, the region proposal component can use a general object region proposal to determine a first set of candidate bounding boxes for the received image. For example, in the situation where BING or another similar approach is used, the default model can be trained using one or a number of object detection datasets (e.g., Pascal VOC07), and the parameters of the default model can be selected to produce a predetermined number of candidate bounding boxes (e.g., around five thousand). In this example, the predetermined number of candidate bounding boxes corresponds to the first set of candidate bounding boxes. In a second step, the region proposal component can use a text-specific or other word region proposal approach to generate a second set of candidate bounding boxes. The first and second set of candidate bounding boxes can be combined to generate the plurality of candidate bounding boxes.

In accordance with some embodiments, in the situation where MSER or another similar approach is used, the original MSER can be applied to generate a set of basic candidate bounding boxes. In accordance with various embodiments, the set of basic candidate bounding boxes can include a full letter or parts of a letter. Similarity distances between these basic candidate bounding boxes can be calculated based on their similarity in size, shape and location. A resulting distance matrix can be used with a bottom-up hierarchical clustering process to generate a clustering tree. In this tree, letters in a word can be grouped together and cutting off the tree with a diameter threshold can generate a set of word proposals. To cover different scales, multiple thresholds can be used. In various embodiments, to cover different text orientations, multiple distance matrices, each with an emphasis on a given main direction can be used to create multiple trees. The second set of candidate bounding boxes is the combination of all resulting ones from different trees using different thresholds, which can be around one thousand bounding boxes.

The region filtering component 226 of recognition algorithm 222 can be configured to determine a subset of the plurality of candidate bounding boxes and thus reduce the number of candidate bounding boxes. For example, in various embodiments, many candidate bounding boxes do not contain text and in at least some embodiments, a neural network can be trained to recognize bounding boxes that do not contain text to filter out such bounding boxes. Neural networks (NNs), such as convolutional neural networks, are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. NNs exploit spatially-local correlation by enforcing a local connectivity pattern between nodes of adjacent layers of the network. Different layers of the network can be composed for different purposes, such as convolution and sub-sampling. In one example there is an input layer which along with a set of adjacent layers forms the convolution portion of the example network. The bottom layer of the convolution layer, along with the lower layer and output layer, make up the fully connected portion of the network. From the input layer, a number of output values can be determined from the output layer, which can include several items determined to be related to an input item, among other such options. NN is trained on a similar data set (which includes bounding boxes with text, bounding boxes with no text, etc.), so the network can learn the best feature representation for this type of image. Trained NN can be used as a feature extractor: an input image can be passed through the network and intermediate layer outputs can be used as feature descriptor of the input image. The trained NN can then be used to detect bounding boxes that do not contain text.

In at least some embodiments, the trained NN can be a trained multi-task neural network: one task for text/no-text classification and one task for shift regression. As will be described further herein, the shift regression task can be used to determine how to shift the bounding box to a more accurate location such that the bounding box actually includes a text.

In at least some embodiments, the neural network can be trained using sets of images for specific classifications of text. For example, a neural network might be trained using data from SVT-train and ICDAR03-train. It should be noted that other datasets can be used. In this example, positive samples are random patches that have an intersection over union (IOU) score greater than a predetermined threshold (e.g., 0.5) with a ground truth box while negative samples have IOU less than a predetermined threshold (e.g., 0.1). An IOU score can be determined by taking the intersection of the proposal region with its ground truth region and dividing by the union of the proposal region and ground truth region. At classification time, a threshold is chosen so that a predetermined number of bounding boxes (e.g., 1K) are retained.

The region refining component 228 can be configured to refine the bounding box coordinates to more accurately fit the text represented in the image. Refining the bounding box can include changing a size (e.g., bigger, smaller) of a bounding box, repositioning a bounding box, changing a shape of a bounding box, or a combination thereof. In this example, a regression CNN can be trained using one or more data sets, and the trained CNN is operable to refine the coordinates of the candidate bounding boxes obtained from the region proposal component. For example, the outputs of the region proposal component and region filtering component are normalized coordinates of the top-left and bottom right corners.

The text recognizer component 230 is configured to analyze the bounding boxes proposed by the region refining component and can generate a classification vector or other categorization value that indicates the probability that a respective bounding box includes an instance of a certain word. The classification vector can include an entry (i.e., a probability) for each of the categories (e.g., words) the text recognizer component is trained to recognize. In various embodiments, the word recognizer can be a CNN (e.g., a trained word recognition neural network) that maps a bounding box with text to a word in a predefined dictionary.

The post processing component 232 can be configured to suppress overlapping words to generate a final set of words. For example, in various embodiments, the output of region proposal filtering component contains a lot of overlapping words. A post processing step can be used to eliminate these duplications. In accordance with various embodiments, the post processing component can perform non-maximum suppression (NMS) of overlapping words. In this example, two kinds of NMS can be used: per-word NMS and cross-word NMS, where NMS can be interleaved with the region refining process. As an example, a variant of bounding box regression called word-end regression can be used. For example, the networks employed are the same, but the extracted regions are only around the two ends of (long) words. In accordance with various embodiments, after several iterations of refinement, the position of the bounding boxes might change. Accordingly, the text recognizer component can be rerun to relabel the bounding boxes. Finally, a grouping step is performed to eliminate words that are contained inside other words.

The normalization module 234 can be configured to normalize the confidence values associated with recognized text from recognition engine 204 and recognition engine 206. As described, the recognized text can be associated with a confidence value. The confidence value can be a score representing a confidence that the word was correctly recognized. The confidence value can be determined by the algorithm used to recognize respective words. The confidence values can vary between different recognition algorithms depending on a number of different variables including the font style, font size, whether the text is bolded, underlined, or italicized, the recognition algorithms process, among other such factors. Accordingly, to compare and/or combine confidence values for words recognized using different approaches, the confidence values associated with respective words can be normalized to a common scale. For example, the confidence values associated with words recognized from recognition engine 206 can be normalized to a same scale as the confidence values associated with words recognized from recognition engine 204. Alternatively, the confidence values associated with words recognized from recognition engine 204 can be normalized to a same scale as the confidence values associated with words recognized from recognition engine 206. It should be noted that any such normalizing approach known in the art can be used normalize the values generated from one recognition algorithm with those of a different recognition algorithm.

After the confidence values for the recognized text have been normalized, the combination module 220 can determine a merged set of words that is a compilation of the recognized text from recognition engine 204 and recognition engine 206 weighted by their respective confidence values. In order to accomplish this, a correspondence between the recognized text from each recognition engine 204 and recognition engine 206 is established. In this example, recognition engine 204 and recognition engine 206 will report coordinates of a bounding box for the recognized text. The bounding box for the recognized text is then used to align the recognized text from recognition engine 204 and recognition engine 206 to determine a correspondence. An overlap percentage of the bounding boxes can be used to map recognized text from one recognition engine to recognized text from another recognition engine. The overlap between bounding boxes can be determined using any number of distance determining techniques. The amount of overlap and/or distances between bounding boxes can be calculated based on their similarity in size, shape, location, among other such factors.

For bounding boxes that overlap a threshold amount (e.g., distance, percentage, etc.), the confidence value associated with recognized text in the overlapping bounding boxes can be compared. If the confidence value for depth-focused recognized text received from recognition engine 206 is higher than the confidence value for width-focused recognized text received from recognition engine 204, the depth-focused recognized text from recognition engine 206 can be selected and can be associated with any logical structure information that was associated with the width-focused recognized text from recognition engine 204. In considering logical structure information, a document may be regarded not only as text, but as an object with a physical and a logical structure. The physical structure or document layout is what makes text information in a document. Physical structure is intended to keep information in an ordered form for proper and better presentation. It manifests itself as the physical arrangement of form elements such as images, tables, columns, etc. Recognition engine 204 may detect the position of form elements in a document (e.g., a document represented in image data) and reconstruct them. The logical structure of the document maps the form elements into one or more logical blocks based on an understanding of the meaning of the form elements and the relations between them. The logical structure is what controls the logical ordering (e.g., viewing and reading order) of the information in a document. The logical structure includes information about the purpose and/or meaning of all form elements and defines the reading order in which the information contained in the document should be perceived.

If the confidence value for width-focused recognized text received from recognition engine 204 is higher than the confidence value for depth-focused recognized text received from recognition engine 206, the width-focused recognized text from recognition engine 204 are used and the logical structure is maintained. In the situation where the bounding boxes do not overlap the threshold amount, the depth-focused recognized text from recognition engine 206 are appended to the merged set of words.

Thereafter, a final set of words that includes at least the merged set of words can be determined, where at least a portion of the merged set of words can be associated with the logical structure information. For example, recognized text determined from overlapping bounding boxes can be associated with logical structure information and recognized text determined from bounding boxes that do not overlap can be included with the final set of words; however, without logical structure information. In certain embodiments, a post-processing processing can be executed to determine at least some logical structure information for recognized text determined from bounding boxes that did not overlap. This can include, for example, analyzing neighing recognized text associated with logical structure information to make a determination how words without logical structure information associate with words without logical structure. Factors that can be useful include, for example, the distance between words, the font for neighboring words, the color of neighboring words, the shape and size of neighboring words, etc. Accordingly, image processing techniques can be utilized to determine a visual similarity based on, e.g., font, color, shape, size, etc., between recognized text associated with logical structure information and recognized text not associated with logical structure information. In the situation where the visual similarity meets a threshold visual similarity, logical structure information can be associated with recognized text that are not associated with logical structure information.

In accordance with various embodiments, the recognition engines may be performed by any number of server computing devices, desktop computing devices, mainframe computers, and the like. Each individual device may implement one of the modules of a recognition engine. In some embodiments, the one of or both recognition engines can include several devices physically or logically grouped together to implement one of the modules or components of the of the recognition engines. For example, recognition engine 204 can include various modules and components combined on a single device, multiple instances of a single module or component, etc. In one specific, non-limiting embodiment, recognition engine 204 can execute on one device and recognition engine 206 can execute on another device. In another embodiment, the recognition engines can execute on the same device. In yet another embodiment, the merger module 236 can execute on a device separate one or both recognition engines or on the same device as one or both recognitions.

In some embodiments, the features and services provided by the recognition engines may be implemented as web services consumable via a communication network. In further embodiments, the recognition engines are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the recognition engines may be integrated into the portable computing device such that network connection and one or more separate computing systems are not necessary to perform the processes of the present disclosure.

Figure 3:
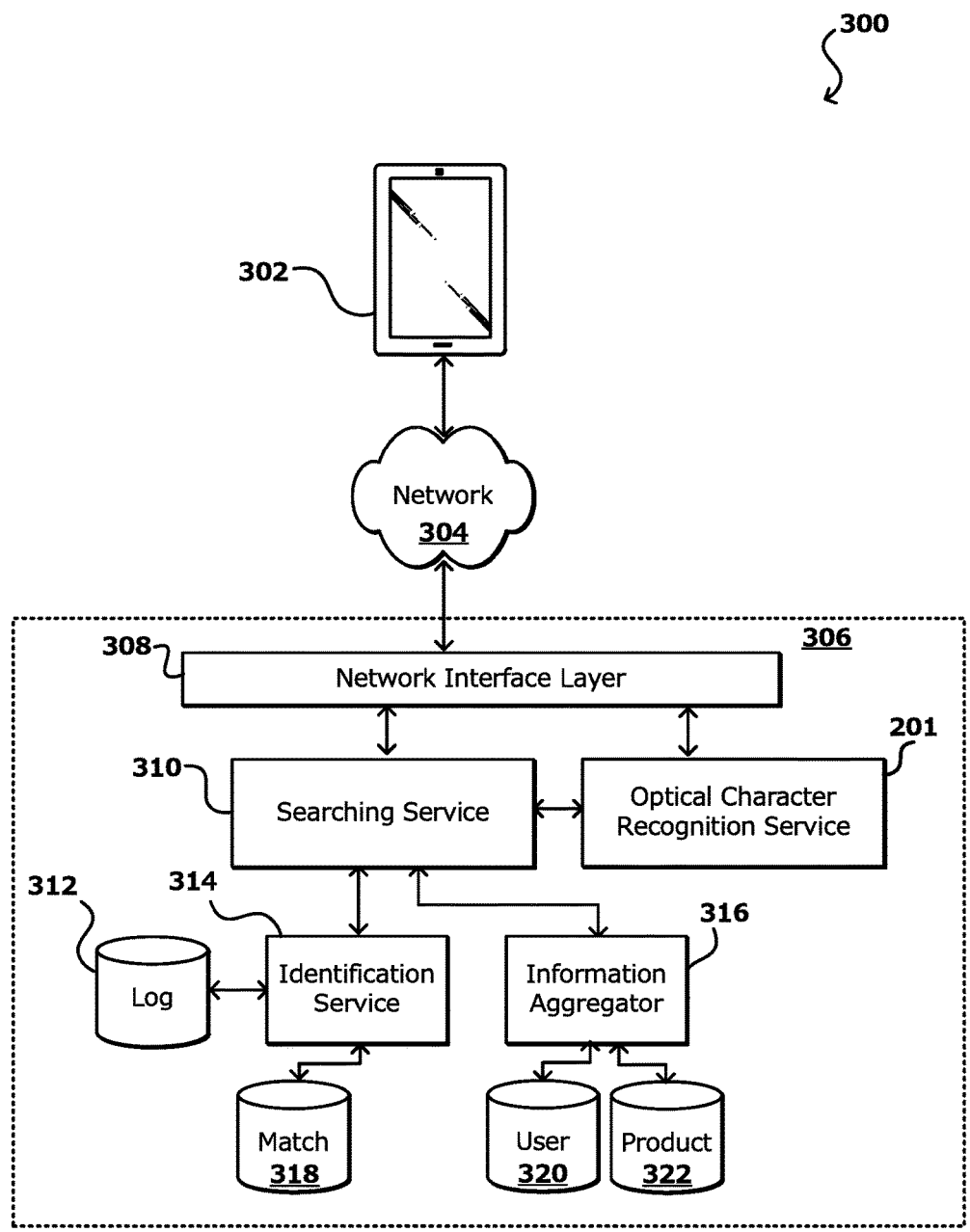
FIG. 3 illustrates an example environment in which various embodiments can be implemented.

FIG. 3 is an example environment 300 in which a user can utilize a computing device to recognize text, in accordance with various embodiments. It should be understood that the example system is a general overview of basic components, and that there can be many additional and/or alternative components utilized as known or used in the art for recognizing text in multiple images. In this example, a user is able to capture image data of a live camera view of one or more objects that include text using a computing device 302. In various embodiments, the image data can be captured image data (e.g., still images and/or video data) or downloaded image data. An application executing on the computing device (or at least in communication with the computing device) can analyze the image data of the live camera view to recognize any text represented in the image data as well as determine a location or region of the image that includes the representation of the text.

The computing device can send at least a portion of information across at least one appropriate network 304, such as may include the Internet, a local area network (LAN), a cellular network, and the like. The request can be sent to an appropriate content provider 306, as may provide one or more services, systems, or applications for processing such requests. In this example, the request is received to a network interface layer 308 of the content provider 306. The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request, and cause at least a portion of the information in the request to be directed to an appropriate system or service, such as a searching service 310 and optical character recognition service 201.

The optical character recognition service 201 includes an image-processing module that can apply different operators or techniques to pre-process the images before submitting the images to one or more optical character recognition engines. Examples of the operators include a Laplacian-or-Gaussian filter, thresholding filters, and so forth, which enhance or mitigate different characteristics of the images. Examples of these characteristics include intensity, blurriness, and so forth. After pre-processing, the one or more recognition engines of the optical character recognition service 201 concurrently recognizes text from the image to produce multiple recognized text outputs. For example, a width-focused recognition engine can be configured to analyze the image data to determine a base-set of words. The base-set of words can be associated with logical structure information that describes a geometric relationship between words in the base-set of words. A set of bounding boxes that includes text can be determined, as well as a confidence value for each word that indicates a likelihood that a word is correctly recognized. A depth-focused recognition engine can be configured to analyze the image data to determine a focused-set of words, the focused-set of words associated with a set of bounding boxes and confidence values for respective words. The confidence values associated with respective sets of words can be normalized to a common scale. Thereafter, a final set of words that includes at least the merged set of words can be determined, where at least a portion of the merged set of words is associated with the logical structure information. At least a portion of these tasks can be performed on the portable computing device 302 or by using at least one resource available across a network as well. In at least some embodiments, an OCR application will be installed on the client device 302, such that much of the processing, analyzing, or other such aspects can be executed on the client device. Various processing steps can be performed by the client device 302, by the content provider 306, or a combination thereof. Therefore, it should be understood that the components and capabilities of the optical character recognition service 201 could wholly or partly reside on the client device 302.

A searching service 310 in this example includes components operable to receive information for recognized text from the optical character recognition service 201, analyze the information, and submit queries to a search engine to return information relating to people, products, places, or things that are determined to match the information within at least an acceptable amount of deviation, within an allowable matching threshold, etc. For example, the searching service 310 in this example can cause information to be sent to at least one identification service 314, device, system, search engine, or module that is operable to analyze the information and attempt to locate one or more matches. In at least some embodiments, an identification service 314 will process the information, such as to extract specific words or phrases, then compare the processed data against data stored in a matching data store 318 or other such location. In various embodiments, the identification service utilizes one or more search engines to determine one or more matches. The data in an image matching data store 318 might be indexed and/or processed to facilitate with matching, as is known for such purposes.

The searching service 310 can receive information from each contacted identification service 314 as to whether one or more matches could be found with at least a threshold level of confidence, for example, and can receive any appropriate information for a located potential match. The information from each identification service can be analyzed and/or processed by one or more applications of the searching service, such as to determine data useful in obtaining information for each of the potential matches to provide to the user. For example, a searching service might receive text, phrases, bar codes, product identifiers, or any other types of data from the identification service(s), and might process that data to be provided to a service such as an information aggregator service 316 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 316 can utilize the aggregated data from the searching service 310 to attempt to locate products, in a product data store 322 or other such location, which are offered through the marketplace and that match, or are otherwise related to, the potential match information. For example, if the identification service identifies a matching object, the information aggregator can attempt to determine whether objects of that type are offered through the marketplace, or at least for which information is available through the marketplace. In at least some embodiments, the information aggregator can utilize one or more suggestion algorithms of a search engine or other such approaches to attempt to determine related elements that might be of interest based on the determined matches. In some embodiments, the information aggregator can return various types of data (or metadata) to the searching service, as may include item description, availability, reviews, and the like. In other embodiments, the information aggregator might instead return information such as a product identifier, uniform resource locator (URL), or other such digital entity enabling a browser or other interface on the client device 302 to obtain information for one or more products, etc. The information aggregator can also utilize the aggregated data to obtain various other types of data as well. Information for located matches also can be stored in a user data store 320 of other such location, which can be used to assist in determining future potential matches or suggestions that might be of interest to the user. Various other types of information can be returned as well within the scope of the various embodiments.

The searching service 310 can bundle at least a portion of the information for the potential matches to send to the client as part of one or more messages or responses to the original request. In some embodiments, the information from the identification services might arrive at different times, as different types of information might take longer to analyze, etc. In these cases, the searching service might send multiple messages to the client device as the information becomes available. The potential matches located by the various identification services can be written to a log data store 312 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components. It should be understood that, although the identification services are shown to be part of the provider environment 306 in FIG. 3, that one or more of these identification services might be operated by third parties that offer these services to the provider.

Figure 4:
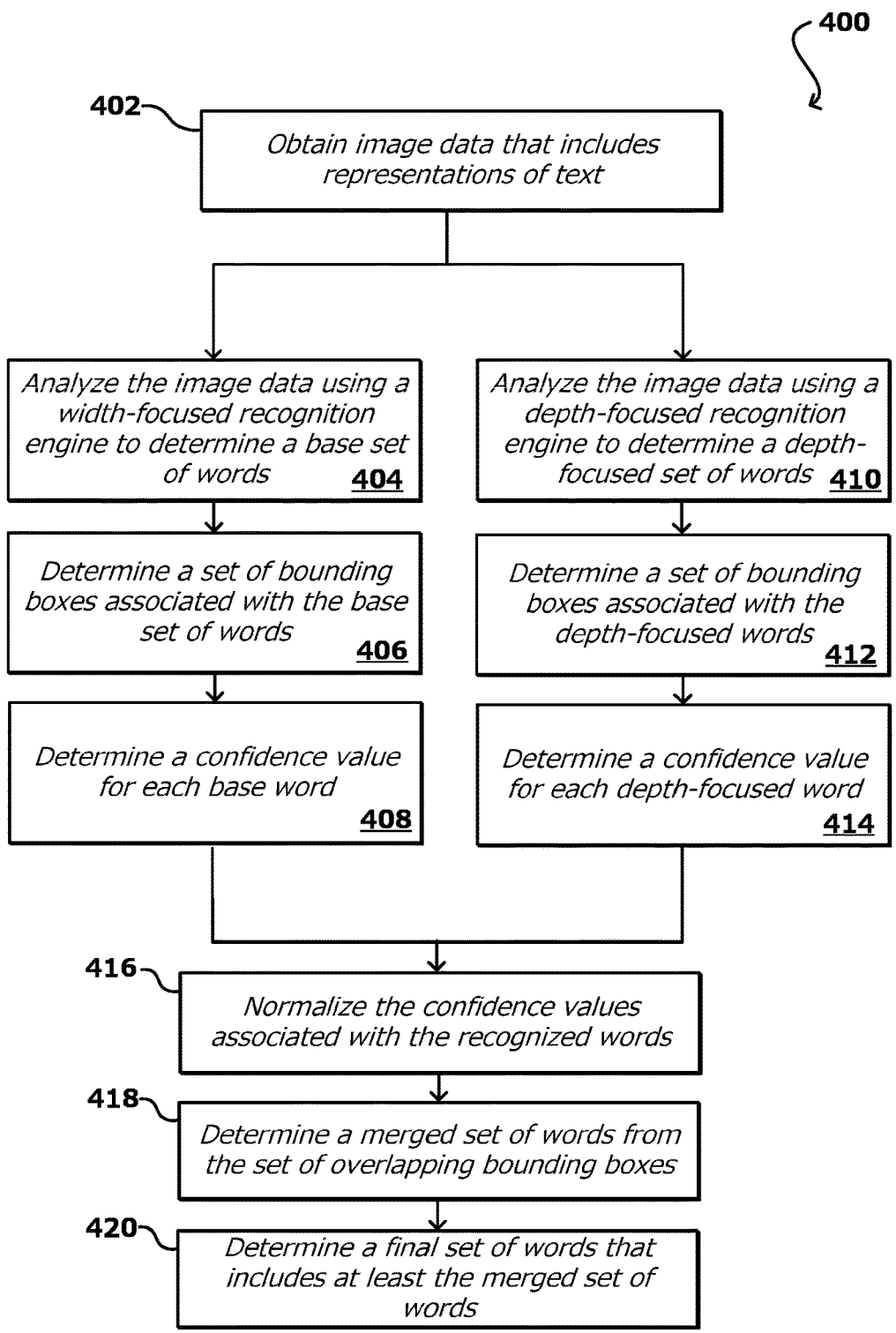
FIG. 4 illustrates an example process of recognizing text in accordance with at least one embodiment.

FIG. 4 illustrates an example process 400 for recognizing text in an image with a computing device that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, image data that includes representations of text is obtained 402. An application executing on the computing device (or at least in communication with the computing device) can analyze the image data to recognize the text represented in the image data as well as determine locations or regions of the image data that include the representations. Analyzing the image data can include substantially simultaneously or concurrently processing the image data with at least two recognition engines, such as at least two optical character recognition (OCR) engines, running in a multithreaded mode. For example, a width-focused recognition engine can be configured to analyze 404 the image data to determine a base-set of words. The base-set of words can be associated with logical structure information that describes a geometric relationship between words in the base-set of words. The logical structure information can include, for example, word, sentence, and paragraph locations in the image data, punctuation for recognized text, etc. A set of bounding boxes associated with the base-set of words can be determined 406. A bounding box can be the coordinates of a rectangular border that fully encloses portions of the image that, for example, include text. A confidence value for each base word that indicates a likelihood that a word is correctly recognized can be determined 408. The confidence value can represent the probability associated with the accuracy of the recognized text for a given recognition approach. Thus, the confidence value for one approach may be a different scale than a confidence from a different recognition approach.

A depth-focused recognition engine can be configured to analyze 410 the image data to determine a depth-focused-set of words. As described, the width-focused recognition engine and the depth-focused recognition can execute currently. In some embodiments, the engines can execute serially. For example, results from the width-focused recognition can be provided to the depth-focused recognition or results from the depth-focused recognition can be provided to the width-focused recognition engine. A set of bounding boxes for one or more depth-focused words can be determined 412 and confidence values for each depth-focused word can be determined 414. The confidence values associated with respective sets of words can be normalized 416 to a common scale. For example, as described, the recognized text can be associated with a confidence value. The confidence value can be a score representing a confidence that the word was correctly recognized. The confidence value can be determined by the algorithm used to recognize respective words. The confidence values can vary between different recognition algorithms depending on a number of different variables including the font style, font size, whether the text is bolded, underlined, or italicized, the recognition algorithms process, among other such factors. Accordingly, to compare and/or combine confidence values for words recognized using different approaches, the confidence values associated with respective words can be normalized to a common scale. For example, the confidence values associated with words recognized from the depth-focused recognition engine can be normalized to a same scale as the confidence values associated with words recognized from the width-focused recognition engine.

After the confidence values for the recognized text have been normalized, a merged set of words from the set of overlapping bounding boxes that includes at least a portion of the base-set of words and/or the focused-set of words is determined 418 based at least in part on respective confidence values o recognized words in the set of overlapping bounding boxes. Thereafter, a final set of words that includes at least the merged set of words can be determined 420, where at least a portion of the merged set of words can be associated with the logical structure information. For example, recognized words determined from overlapping bounding boxes can be associated with logical structure information and recognized words determined from bounding boxes that do not overlap can be included with the final set of words; however, without logical structure information.

In certain embodiments, a post-processing processing can be executed to determine at least some logical structure information for recognized words determined from bounding boxes that did not overlap. This can include, for example, analyzing neighing recognized words associated with logical structure information to make a determination how words without logical structure information associate with words with logical structure. Factors that can be useful in such determination include, for example, the distance between words, the font for neighboring words, the color of neighboring words, the shape and size of neighboring words, etc. Accordingly, various image processing techniques can be utilized to determine a visual similarity based on, e.g., font, color, shape, size, etc., between recognized words associated with logical structure information and recognized words not associated with logical structure information. In the situation where the visual similarity between words meets a threshold visual similarity, logical structure information can be associated with recognized words that are not associated with logical structure information.

In certain embodiments, before analyzing the image data using the width-focused recognition engine, the image data can undergo a pre-processing stage. The pre-processing stage can include the application of various algorithms to remove certain aspects of the image in order to be more reliably read by certain recognition engines (e.g., recognition engine 204). For example, in at least one embodiment, if an image frame is out of focus, an image sharpening algorithm, such as an unsharp masking algorithm, can be applied to improve the image quality before the image is sent to the recognition engine. In at least one embodiment, a user could also be notified or alerted when the images the user is capturing are of low quality, as may be due to movement, for example, and the computing device could guide the user to keep the camera still or otherwise instruct the user while capturing an image to improve the image quality.

In accordance with various embodiments, such approaches can be utilized in a number of different applications. For example, the final set of words can be displayed in a popup window, in a side panel, as an overlay, in place of the recognized text, among other such display approaches. In another example, bounding boxes can be displayed on the display screen overlying an image generated using the image data, where each bounding box can include one of the recognized text. In yet example, the recognized text can be emphasized such as by applying visual effects to representations of the recognized text. This can include, for example, overlaying a graphical representation of the recognized text on the image data that varies in font size, color, font type, among other visual effects. In another example, the recognized text can be used to search for various items associated with the words, to provide information associated with the words, etc. For example, in the situation where the words are displayed to the user, the user can select one or more words to be used in a search query to obtain results related to the selected words.

In another such application, e.g., an augmented reality (AR) application, a computing device can be trained to be interested in actionable text entity types, such as phone numbers, URLs, and email addresses. For example, if a string appears to be a phone number (based on the number and percentage of the digits in the string certain characters will be replaced based collected confusion patterns, such Z→2, O→0, and so on. The recognized text can then be provided to an application executing on the computing device corresponding to the text entity type for use by the application. In the example above, based on the pattern, the computing device can determine that the test entity type is a phone number, recognize the text using the recognition process described above, and provide the number to a phone application for calling the number. Other text entity types can also be used as described or suggested elsewhere herein.

Since a camera can capture multiple frames of a target in a continuous manner, multiple image frames can be combined to increase accuracy of the recognized text from the recognition engines. For example, multiple outputs from each recognition engine corresponding to multiple images can be compared to either verify image details or to capture details that have been obscured or are missing in one image or frame. A word's confidence value, for example, can be a function, such as a summation, of individual image frame scores from multiple images. Once an accumulated score of a word passes a certain threshold or a certain time lapses without any text exceeding a desired score threshold, for example, the text can be presented to the user or relevant application.

Further, multiple image frames can be sent to the recognition engines at the same time or a single image can be sent and, if the confidence values from the recognized text for a respective image is below a determined threshold, a subsequent image can be sent and processed. In the later example, a controller can continue to process additional images until a cumulative confidence value for the images reaches a level above the determined threshold. For example, if the determined threshold is 0.80 and the confidence of a first image frame is 0.55, the controller have a second image frame processed. In this example, if the confidence value for a combination function or summation of the first and second image frames still does not at least equal 0.80, a third image frame can be processed. Therefore, in one example, a computing device can send a server a single image to be processed by the recognition engines and, upon returning a confidence value below the threshold, the computing can send a second image for processing. Accordingly, subsequent image frames can be processed until the cumulative confidence value at least equals the predetermined threshold. In this example, the first, second, and third image frames could be adjacent frames or they could be spaced apart by any number of frames, such as having 10, 50, or 100 frames between depending on factors such as frame rate.

In a continuous image capture and processing mode, since information for a target string of text can be verified across multiple images, preprocessing techniques may not be necessary to efficiently and effectively recognize the text. In a non-continuous mode, however, where a single image is provided to the recognition engines, for example, preprocessing will be more important since there are not multiple frames to cross-reference therewith and as much accurate information must be extracted from the single image as possible. In either of these cases, a controller can determine the appropriate amount of preprocessing for a given situation.

Further, detecting text in an image can include more or fewer steps as described above. For example, in regard to the width-focused recognition engine, the image can include performing glyph detection on the image. The image can be separated into regions of similar grayscale values that fall within predefined size constraints called glyphs. Character classification can then be performed, where any glyphs that are not characters are removed using machine learning algorithms or other similar algorithms. Pair finding/word finding can then be performed, where the glyphs are grouped into words and lines, and baseline estimation can then be performed on the words and lines to estimate lines for the top and bottom points on the words. Word splitting can then be performed, where the spaces between the glyphs can be examined to decide word boundaries used for evaluation or display purposes. Binarization can then be performed, where the regions are binarized to produce a crisp mask which can include any punctuation that may have been filtered out earlier due to the minimum size constraint, for example.

Glyph detection can further include extracting maximally stable extremal (MSERs) regions from the image. An extremal region can be a set of connected pixels which have grayscale values above some threshold, and where the size of the region does not change significantly when the threshold is varied over some range. In addition to being stable, the regions can contain most of the edge intensity found by computing a gradient image beforehand. Regions that either have too many or too few pixels, and any MSER whose aspect ratio is too different from normal text or which has more than three child regions, should be ignored.

Character classification can further include extracting features from each MSER, the features including: Bounding Box Aspect Ratio (width over height); Compactness (4 pi times area over perimeter squared); Raw Compactness (4 pi times number of pixels over perimeter squared); Stroke Width (estimated using distance transform) divided by width; Stroke Width (estimated using distance transform) divided by height; Solidity (area over bounding box area); Convexity (convex hull perimeter over perimeter); Number of Holes (e.g., a 'b' has 1 hole, a 'B' has 2 holes, a 'T' has 0 holes). A fixed set of features can be selected and used to train a classifier using a machine learning algorithm such as a support vector machines (SVM) or AdaBoost. A classifier can be used to reject most non-characters from the list of characters, and an operating point on the receiver operating characteristic (ROC) curve can be chosen so that most characters are detected (ie. a low false negative rate), but with a high false positive rate.

Further, pair finding can include sorting the remaining glyphs (MSERs which appear to be characters) left to right, and all pairs which pass a test can be considered a possible character pair. The test compares the distance between glyphs, vertical overlap of two glyphs, their relative height, width, stroke width, and intensity.

Accordingly, word line finding can further include treating each glyph as a vertex in a graph and each pair as an edge, then using an iterative dynamic programming algorithm to extract the best (e.g., the longest) sequence of edges, where the longest edges become word candidates. Additionally or alternatively, word line finding can include selecting glyphs from left to right after three glyphs are found to be in a good sequence.

Base line estimation can further include estimating the slope of the baseline using a clustering algorithm, then computing intercepts that minimize the minimum distance between baselines and glyphs. Each word candidate can have at least two lines in the top and bottom points of the glyphs, and if two or more words appear to have the same baselines, they can be merged and the lines can be re-estimated. Further, in accordance with an embodiment, glyph refinement can be performed after baseline estimation is performed, where all glyphs that are classified as non-text, but fit into the baseline configuration, are included.

In accordance with an embodiment, word splitting can further include estimating the spaces between glyphs in each baseline and choosing a threshold, where any gap between characters greater than that threshold can be considered to be a word boundary (space) and can be marked as such.

In accordance with an embodiment, binarization can further include binarizing each region in the bounding box based at least in part on the threshold used to compute the regions character and the regions character's neighbors.

In another example, in regard to the depth-focused recognition engine, a first stage can include a region proposal step where a large number of proposals (e.g., bounding boxes) are generated for possible text regions in the image. This step may identify many proposals, and subsequent stages are designed to increase the precision by reducing the number of proposals without lowering the recall. In some examples, the proposals are generated using both MSER (maximally stable extremal regions) and BING. In the next step, many of these proposals are filtered using a convolutional neural network (CNN) with a regression (Euclidean) loss and a SoftMax loss function. The location of these filtered bounding boxes are then refined using regression CNNs. The refinement is done with several recursive iterations. A classification CNN is then used to map the bounding boxes to words in a large (e.g., 90K words) predefined dictionary. Because the resulting predictions might contain a lot of overlapping and duplicated recognized text (e.g., at the same location there might be multiple overlapping results), a post-processing step can be implemented to merge and clean up the recognition results. A post processing step can include several stages. It can begin with a non-maximum suppression with boundary refinement. The boundary refinement is accomplished using bounding box regression by expanding only the ends of the words rather than the entire word. Next, the word recognition is rerun to improve the labeling. Finally, a grouping is performed to eliminate words contained within other words.

Figure 5:
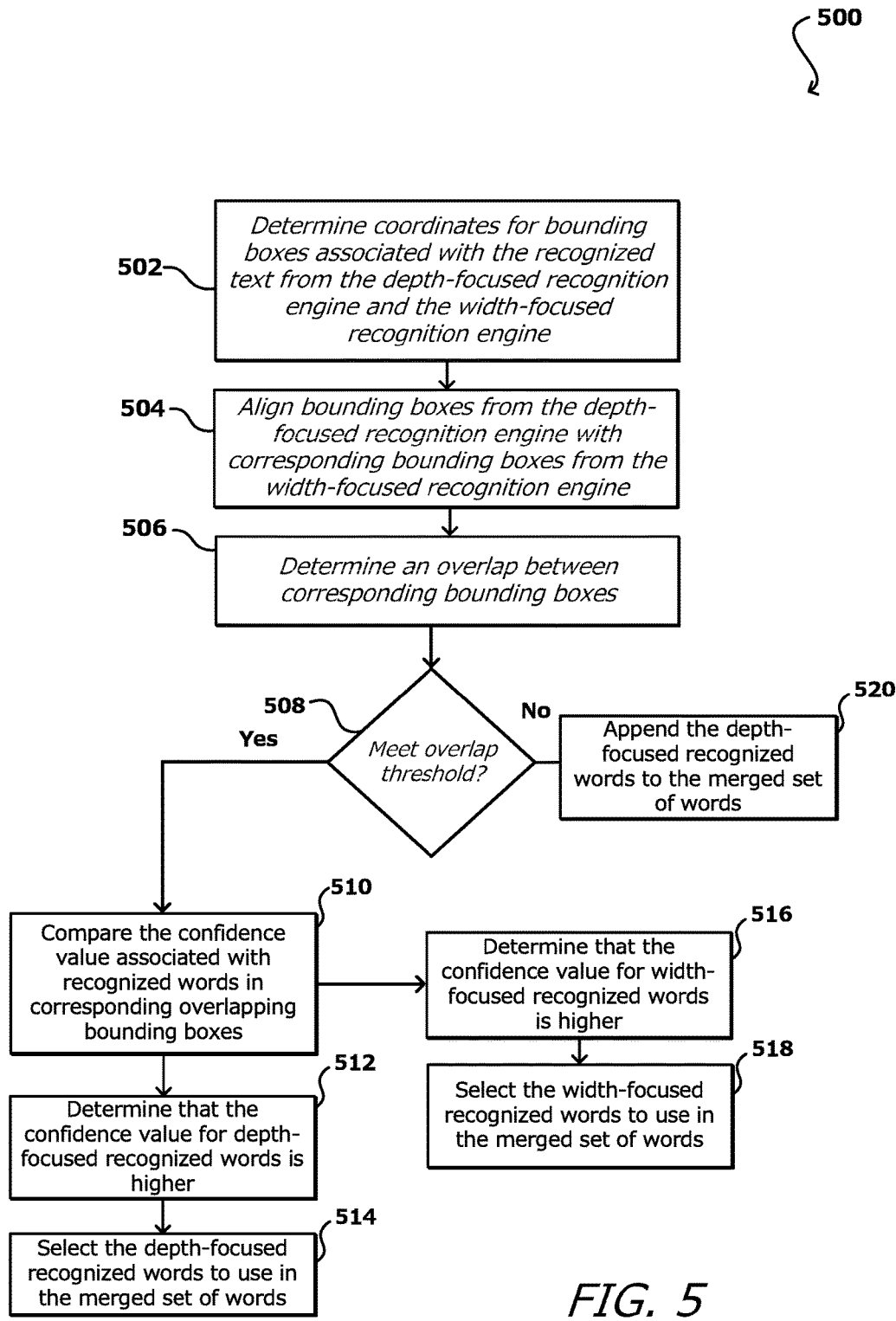
FIG. 5 illustrates an example process of merging recognized text in accordance with at least one embodiment.

FIG. 5 illustrates an example process 500 for determining the merged set of words described in FIG. 4 in accordance with various embodiments. In accordance with various embodiments, determining the merged set of words can includes determining a correspondence between recognized words from the depth-focused recognition engine and the width-focused recognition engine. For example, coordinates for bounding boxes associated with recognized words from the depth-focused recognition engine (i.e., depth-focused words) and the width-focused recognition engine (i.e., width-focused words) are determined 502. Bounding boxes associated with the depth-focused words and corresponding bounding boxes associated with the width-focused words are aligned 504. An overlap between corresponding bounding boxes is determined 506. The amount of overlap and/or distances between bounding boxes can be calculated based on their similarity in size, shape, location, among other such factors, where the overlap between bounding boxes can be determined using any number of distance determining techniques.

A determination 508 is made whether the bounding boxes overlap a threshold amount. For bounding boxes that overlap a threshold amount (e.g., distance, percentage, etc.), the confidence value associated with recognized text in corresponding overlapping bounding boxes can be compared 510. In response to determining 512 that the confidence value for depth-focused recognized text received from the depth-focused recognition engine is higher than the confidence value for corresponding width-focused recognized text received from the width-focused recognition engine, the depth-focused recognized words can be selected 514 for use in the merged set of words and can be associated with any logical structure information that was associated with the width-focused recognized words from the width-focused recognition engine. In response to determining 516 that the confidence value for width-focused recognized words received from the width-focused recognition engine is higher than the confidence value for depth-focused recognized words received from the depth-focused recognition engine, the width-focused recognized words can be selected 518 for use in the merged set of words and the logical structure is maintained. In the situation where the bounding boxes do not overlap the threshold amount, the depth-focused recognized text from are appended 520 to the merged set of words.

Figure 6:
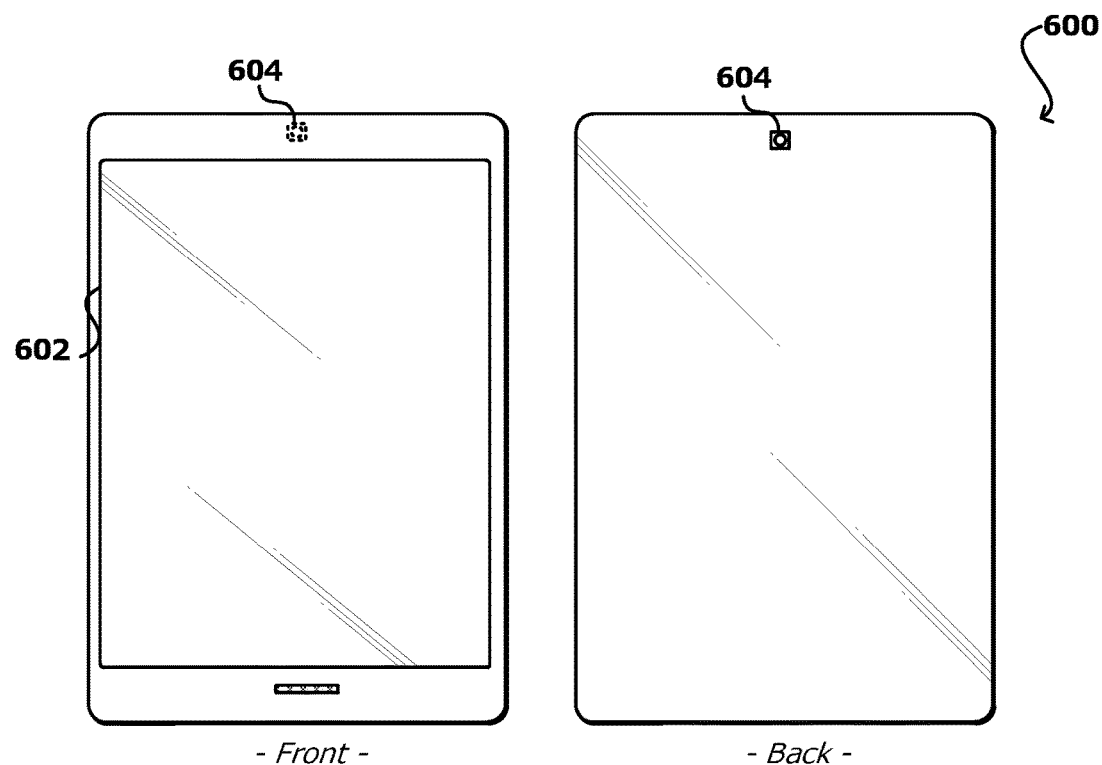
FIG. 6 illustrates an example computing device that can be used to implement aspects of various embodiments.

FIG. 6 illustrates an example of a computing device 600 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602, which under normal operation will display information to a user facing the display screen (e.g., on the same side of the computing device as the display screen). The computing device in this example can include one or more image capture elements, in this example including one image capture element 604 on the back side of the device, although it should be understood that image capture elements could also, or alternatively, be placed on the sides or corners of the device, and that there can be any appropriate number of capture elements of similar or different types. Each image capture element 604 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 7:
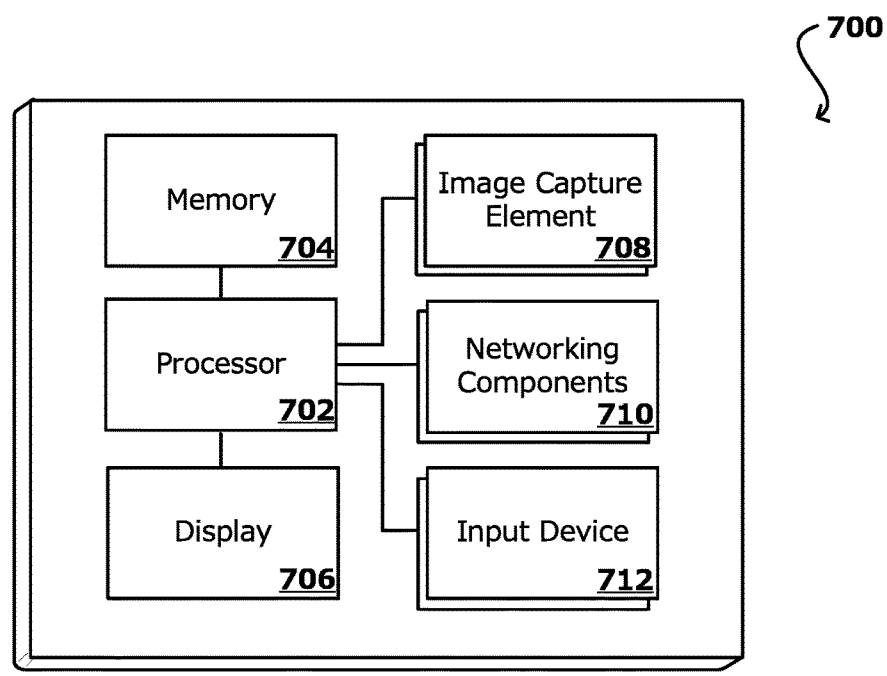
FIG. 7 illustrates example components that can be used with a device such as that illustrated in FIG. 6.

FIG. 7 illustrates a set of basic components of a computing device 700 such as the device 600 described with respect to FIG. 6. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the processor 702, the same or separate storage can be used for images or data, a removable memory can be available for sharing information with other devices, and any number of communication approaches can be available for sharing with other devices. The device typically will include some type of display element 706, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 708, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 710 enabling the device to communicate with remote systems or services such as content providers and rights determining systems. These components can include, for example, wired or wireless communication components operable to communicate over a network such as a cellular network, local area network, or the Internet. The device can also include at least one additional input device 712 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining image data that includes representations of text;
   analyzing the image data using a first recognition engine to determine a first grouping of words using character detection;
   determining a first confidence value for each word in the first grouping of words, wherein the first confidence value for each word is based at least in part on a confidence value for each character of the word;
   determining first position information associated with each word in the first grouping of words;
   analyzing the image data using a second recognition engine to determine a second grouping of words, the second recognition engine utilizing at least one trained neural network, wherein determining the second grouping of words comprises identifying a plurality of possible text regions in the image data and recognizing words within the plurality of possible text regions;
   determining a second confidence value for each word in the second grouping of words, wherein the second confidence value for each word is determined based in part on a statistical analysis of training the at least one trained neural network using one or more data sets;
   determining second position information associated with each word in the second grouping of words;
   determining a set of overlapping words based at least in part on the first position information and the second position information that satisfy an overlap threshold based on distance;
   calibrating the second confidence values with the first confidence values, wherein the calibrating includes normalizing the second confidence values to a scale associated with the first confidence values or normalizing the first confidence values to a scale associated with the second confidence values; and
   merging at least a portion of the set of overlapping words based at least in part on respective first confidence values and respective second confidence values to generate a merged set of words.

2. The computer-implemented method of claim 1, wherein the first recognition engine includes a first recognition algorithm and a second recognition algorithm, the method further comprising:
   using a binarizing technique to binarize the image data to generate binarized image data;
   concurrently recognizing text represented in the binarized image data with the first recognition algorithm and the second recognition algorithm;
   determining a first probability score for text recognized by the first recognition algorithm and a second probability score for text recognized by the second recognition algorithm; and
   based at least in part on a combination function of the first and second probability scores, generating the first grouping of words comprising at least a portion of one of recognized text from the first recognition algorithm or recognized text from the second recognition algorithm, wherein the first confidence value for each word in the first grouping of words is further dependent on the first probability score and the second probability score.

3. The computer-implemented method of claim 2, wherein generating the first grouping of words further includes:
   applying a linear combination of the first probability score and the second probability score associated with recognized text from the first recognition algorithm and the second recognition algorithm.

4. The computer-implemented method of claim 1, wherein the at least one trained neural network utilized by the second recognition engine includes a first trained neural network, a second trained neural network, and a third trained neural network, the method further comprising:
   using the first trained neural network to identify a set of bounding boxes for the plurality of possible text regions;
   using the second trained neural network to update a position of each bounding box of the set of bounding boxes to include text representations, the position of each bounding box associated with respective second position information; and
   using the third trained neural network to recognize words associated with each of the bounding boxes based at least in part on text representations included in respective bounding boxes.

5. The computer-implemented method of claim 1, further comprising:
   determining at least one word recognized by the first recognition engine that does not satisfy the overlap threshold, the at least one word included with the first grouping of words;
   determining logical structure information associated with the at least one word; and
   appending the at least one word with the merged set of words.

6. The computer-implemented method of claim 1, further comprising:

determining at least one word recognized by the second recognition engine that does not satisfy the overlap threshold, the at least one word included with the second grouping of words;

and appending the at least one word with the merged set of words.

7. The computer-implemented method of claim 1, wherein the merged set of words is associated with logical structure information that defines a reading order for the merged set of words, the logical structure information determined based at least in part on a visual similarity between words of the merged set of words.

8. The computer-implemented method of claim 1, wherein:

determining the first grouping of words comprises operations of glyph detection, character classification, baseline estimation, and word splitting; and determining the second grouping of words comprises operations of identifying a set of candidate bounding boxes for the plurality of possible text regions in the image, filtering the plurality of bounding boxes to determine a subset of bounding boxes, refining the subset of bounding boxes in an iterative process, and recognizing words associated with each of the bounding boxes based at least in part on text representations included in respective bounding boxes to determine the second grouping of words.

9. The computer-implemented method of claim 8, further comprising calculating a product between the first confidence values and the second confidence values to combine the first confidence values and the second confidence values.

10. The computer-implemented method of claim 1, further comprising:

aligning the first grouping of words and the second grouping of words; and determining an amount of overlap between the first grouping of words and the second grouping of words;

determining that the amount of overlap between a pair of overlapping words meets the overlap threshold;

comparing confidence values between the pair of overlapping words; and selecting a word associated with a highest confidence value between the pair of overlapping words to use in the merged set of words.

11. The computer-implemented method of claim 1, further comprising:

displaying the image data on a display screen of a computing device; and overlaying a graphical representation of the merged set of words on displayed image data.

12. The computer-implemented method of claim 1, wherein the first recognition engine executes on a first computing device and the second recognition engine executes on a second computing device, the first computing device and the second computing device provided by a service provider of a computing environment.

13. A computing system, comprising:

at least one processor; and memory including instructions that, when executed by the at least one processor, enable the computing system to:

obtain image data that includes representations of text;

analyze the image data using a first recognition engine to determine a first grouping of words using character detection;

determine a first confidence value for each word in the first grouping of words, wherein the first confidence value for each word is based at least in part on a confidence value for each character of the word;

determine first position information associated with each word in the first grouping of words;

analyze the image data using a second recognition engine to determine a second grouping of words, the second recognition engine utilizing at least one trained neural network, wherein determining the second grouping of words comprises identifying a set of candidate bounding boxes for a plurality of possible text regions in the image data and recognizing words within the plurality of possible text regions;

determine a second confidence value for each word in the second grouping of words, wherein the second confidence value for each word is determined based in part on a statistical analysis of training the at least one trained neural network using one or more data sets;

determine second position information associated with each word in the second grouping of words;

determine a set of overlapping words based at least in part on the first position information and the second position information that satisfy an overlap threshold based on distance;

calibrate the second confidence values with the first confidence values, wherein the calibrating includes normalizing the second confidence values to a scale associated with the first confidence values or normalizing the first confidence values to a scale associated with the second confidence values; and merge at least a portion of the set of overlapping words based at least in part on respective first confidence values and respective second confidence values to generate a merged set of words.

14. The computing system of claim 13, wherein the at least one trained neural network used by the second recognition engine includes a first trained neural network, a second trained neural network, and a third trained neural network, wherein the first trained neural network is trained to detect regions of the image data that do not contain text, wherein the second trained neural network is operable to iteratively adjust a size of each bounding box of a set of bounding boxes to accommodate one or more words in their entirety, iteratively adjust a size of a bounding box of the set of bounding boxes to accommodate one or more words in their entirety, iteratively reposition a bounding box of the set of bounding boxes to accommodate one or more words in their entirety, or iteratively change a shape of a bounding box of the set of bounding boxes to accommodate one or more words in their entirety, and wherein the third trained neural network is operable to recognize words.

15. The computing system of claim 13, wherein the instructions, when executed by the at least one processor, further enable the computing system to:

receive a selection of a recognized word from a list of recognized text;

cause a query to be executed against a data source, the query including the recognized word;

receive, in response to the query, result information for a set of items, the set of items determined by comparing the word to a library of words, each word in the library of words associated with at least one item; and display, on a display screen of a computing device, the result information for the set of items.

16. The computing system of claim 15, wherein displaying the result information for at least an item of the set of items includes switching to a result view, the results view including one of a price of the item, a rating of the item, images of the item, and additional information about the item.

17. A non-transitory computer-readable medium including instructions stored therein that, when executed by at least one computing device, cause the at least one computing device to:
   obtain image data that includes representations of text;
   analyze the image data using a first recognition engine to determine a first grouping of words using character detection;
   determine a first confidence value for each word in the first grouping of words, wherein the first confidence value for each word is based at least in part on a confidence value for each character of the word;
   determine first position information associated with each word in the first grouping of words;
   analyze the image data using a second recognition engine to determine a second grouping of words, the second recognition engine utilizing at least one trained neural network, wherein determining the second grouping of words comprises identifying a plurality of possible text regions in the image and recognizing words within the plurality of possible text regions,
   determine a second confidence value for each word in the second grouping of words, wherein the second confidence value for each word is determined based in part on a statistical analysis of training the at least one trained neural network using one or more data sets;
   determine second position information associated with each word in the second grouping of words;
   determine a set of overlapping words based at least in part on the first position information and the second position information that satisfy an overlap threshold based on distance;
   calibrate the second confidence values with the first confidence values, wherein the calibrating includes normalizing the second confidence values to a scale associated with the first confidence values or normalizing the first confidence values to a scale associated with the second confidence values; and
   merge at least a portion of the set of overlapping words based at least in part on respective first confidence values and respective second confidence values to generate a merged set of words.

18. The non-transitory computer-readable medium of claim 17, wherein the first recognition engine includes a first recognition algorithm and a second recognition algorithm, and further comprising instructions that when executed by the at least one computing device, cause the at least one computing device to:
   use a binarizing technique to binarize the image data to generate binarized image data;
   concurrently recognize text represented in the binarized image data with the first recognition algorithm and the second recognition algorithm;
   determine a first probability score for text recognized by the first recognition algorithm and a second probability score for text recognized by the second recognition algorithm; and
   based at least in part on a combination function of the first and second probability scores, generating the first grouping of words comprising at least a portion of one of recognized text from the first recognition algorithm or recognized text from the second recognition algorithm, wherein the first confidence value for each word in the first grouping of words is further dependent on the first probability score and the second probability score.

19. The non-transitory computer-readable medium of claim 18, further comprising instructions that when executed by the at least one computing device to generate the first grouping of words, cause the at least one computing device to:
   apply a linear combination of the first probability score and the second probability score associated with recognized text from the first recognition algorithm and the second recognition algorithm.

20. The non-transitory computer-readable medium of claim 17, wherein the at least one trained neural network used by the second recognition engine includes a first trained neural network, a second trained neural network, and a third trained neural network, and further comprising instructions executed by the at least one computing device, cause the at least one computing device to:
   use the first trained neural network to identify a set of bounding boxes;
   use the second trained neural network to update a position of each bounding box of the set of bounding boxes to include text representations, the position of each bounding box associated with respective second position information; and
   use the third trained neural network to recognize words associated with each of the bounding boxes based at least in part on text representations included in respective bounding boxes.

\* \* \* \* \*